(12) United States Patent
Mazur et al.

(10) Patent No.: US 8,773,817 B2
(45) Date of Patent: Jul. 8, 2014

(54) STORAGE DEVICE HAVING DEGAUSS CIRCUITRY WITH RAMP GENERATOR FOR USE IN GENERATING CHIRPED DEGAUSS SIGNAL

(75) Inventors: Paul Mazur, Cottage Grove, MN (US); Robert A. Norman, Bloomington, MN (US); Jeffrey A. Gleason, Burnsville, MN (US); Anamul Hoque, Lakeville, MN (US)

(73) Assignee: LSI Corporation, San Jose, CA (US)

( * ) Notice: Subject to any disclaimer, the term of this patent is extended or adjusted under 35 U.S.C. 154(b) by 106 days.

(21) Appl. No.: 13/556,480

(22) Filed: Jul. 24, 2012

(65) Prior Publication Data

US 2014/0029138 A1    Jan. 30, 2014

(51) Int. Cl.
*G11B 5/335*    (2006.01)

(52) U.S. Cl.
USPC ......................................................... 360/111

(58) Field of Classification Search
None
See application file for complete search history.

(56) References Cited

U.S. PATENT DOCUMENTS

| | | | |
|---|---|---|---|
| 4,607,310 A | 8/1986 | Channel et al. | |
| 5,053,893 A * | 10/1991 | Hayata et al. | 360/66 |
| 5,710,675 A * | 1/1998 | Goldstone et al. | 360/69 |
| 6,236,555 B1 * | 5/2001 | Leeser | 361/234 |
| 7,092,186 B1 * | 8/2006 | Hogg | 360/60 |
| 7,372,653 B2 | 5/2008 | Suzuki et al. | |
| 7,411,753 B2 * | 8/2008 | Sakai | 360/31 |
| 7,411,756 B2 * | 8/2008 | Wilson et al. | 360/66 |
| 7,787,211 B2 | 8/2010 | Kim et al. | |
| 7,813,068 B2 | 10/2010 | Takeuchi | |
| 7,872,825 B2 | 1/2011 | Sanghvi | |
| 8,537,487 B2 * | 9/2013 | Goldberg et al. | 360/66 |
| 2005/0005044 A1 * | 1/2005 | Liu et al. | 710/74 |
| 2005/0190476 A1 * | 9/2005 | Wilson et al. | 360/46 |
| 2005/0243457 A1 * | 11/2005 | Akamatsu et al. | 360/55 |
| 2006/0044659 A1 * | 3/2006 | Sakai | 360/31 |
| 2006/0139787 A1 * | 6/2006 | Ohinata et al. | 360/46 |
| 2006/0176597 A1 * | 8/2006 | Ngo et al. | 360/46 |
| 2007/0103807 A1 * | 5/2007 | Yang | 360/66 |
| 2007/0153410 A1 | 7/2007 | Hashizume et al. | |
| 2007/0183072 A1 * | 8/2007 | Lee | 360/48 |
| 2008/0024897 A1 * | 1/2008 | Takeda et al. | 360/60 |
| 2008/0316669 A1 | 12/2008 | May | |
| 2012/0105992 A1 * | 5/2012 | Dina et al. | 360/27 |
| 2013/0021691 A1 * | 1/2013 | Goldberg et al. | 360/66 |

OTHER PUBLICATIONS

M.S. Patwari et al., "Simulation of Erase After Write on 2.4T FeCo Solid Pole Writer," IEEE Transactions on Magnetics, May 2010, pp. 1212-1219, vol. 46, No. 5.

(Continued)

*Primary Examiner* — Peter Vincent Agustin
(74) *Attorney, Agent, or Firm* — Ryan, Mason & Lewis, LLP

(57) ABSTRACT

A hard disk drive or other disk-based storage device comprises a storage disk, a write head configured to write data to the disk, and control circuitry coupled to the write head. The control circuitry comprises a write driver and degauss circuitry associated with the write driver. The degauss circuitry is configured to generate a chirped degauss signal to be applied to the write head by the write driver. The degauss circuitry comprises a ramp generator configured to generate a ramp signal for controlling a frequency of at least a portion of a waveform of the chirped degauss signal. The ramp signal generated by the ramp generator may comprise a current ramp that is applied to a control input of a current controlled oscillator of the degauss circuitry.

24 Claims, 6 Drawing Sheets

(56) References Cited

OTHER PUBLICATIONS

M.E. Schabes et al., "Dynamic Micromagnetic Studies of Anisotropy Effects in Perpendicular Write Heads," IEEE Transactions on Magnetics, Oct. 2005, pp. 3073-3075, vol. 41, No. 10.

D.Z. Bai et al., "Degaussing PMR Writer Poles: A Micromagnetic Modeling Study," IEEE Transactions on Magnetics, Oct. 2011, pp. 3407-3410, vol. 47, No. 10.

J.J. Kim et al., "Magnetic Domain Observation in Writer Pole Tip for Perpendicular Recording Head by Electron Holography," Applied Physics Letters, Magnetism and Superconductivity, Apr. 2008, 3 pages, vol. 92, No. 16.

B. Livshitz et al., "Degaussing of Write Heads in Perpendicular Magnetic Recording," IEEE Transactions on Magnetics, Oct. 2011, pp. 3403-3406, vol. 47, No. 10.

H.J. Richter et al., "Unlocking of Remanent Magnetization of Pole Heads by "Rumble Strips"," IEEE Transactions on Magnetics, Oct. 2005, pp. 3061-3063, vol. 41, No. 10.

H.J. Richter et al., "Unlocking of Remanent Magnetization of Pole Heads by Medium Stray Fields," Applied Physics Letter, 2005, pp. 152508, vol. 86.

U.S. Appl. No. 13/186,445 filed in the name of J.S. Goldberg et al. on Jul. 19, 2011 and entitled "Magnetic Storage Device with Chirped Write Head Degaussing Waveform."

U.S. Appl. No. 13/447,741 filed in the name of B. Livshitz et al. on Apr. 16, 2012 and entitled "Storage Device Having Degauss Circuitry with Separate Control of Degauss Signal Steady State and Overshoot Portions."

\* cited by examiner

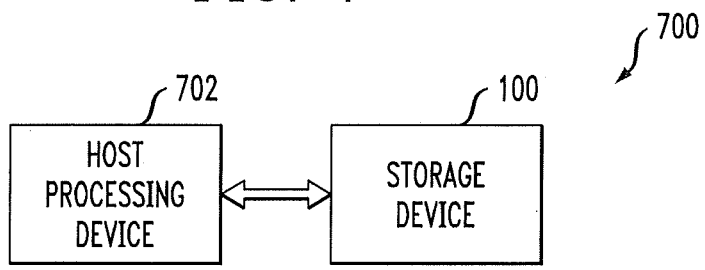
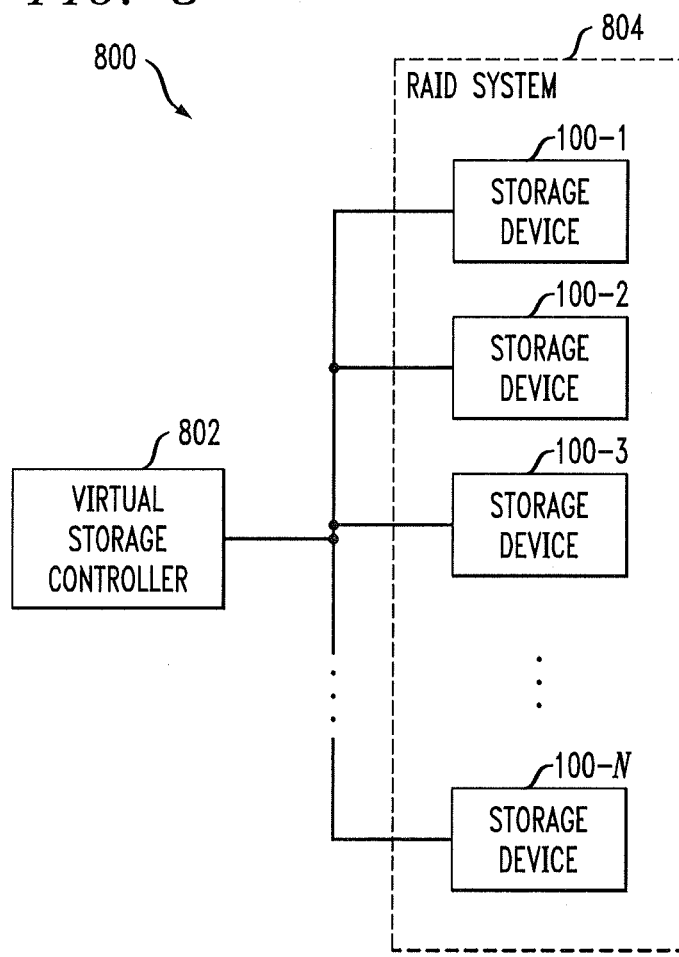

STORAGE DEVICE HAVING DEGAUSS CIRCUITRY WITH RAMP GENERATOR FOR USE IN GENERATING CHIRPED DEGAUSS SIGNAL

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

The storage capacity of HDDs continues to increase, and HDDs that can store multiple terabytes (TB) of data are currently available. However, increasing the storage capacity often involves shrinking track dimensions, bit lengths or other features in order to fit more data onto each storage disk, which can lead to a variety of problems, including degraded on-track recording performance, as well as off-track recording performance issues such as adjacent track erasure.

A number of techniques have been developed in an attempt to further increase storage capacity. For example, a technique known as shingled magnetic recording (SMR) attempts to increase storage capacity of an HDD by "shingling" a given track over a previously written adjacent track on a storage disk. In another technique, referred to as bit-patterned media (BPM), high density tracks of magnetic islands are preformed on the surface of the storage disk, and bits of data are written to respective ones of these islands. Other techniques include, for example, heat-assisted magnetic recording (HAMR) and microwave-assisted magnetic recording (MAMR). The HAMR technique utilizes a laser to locally preheat an area on the disk surface prior to recording in that area. In the MAMR technique, an additional write head is configured to emit an AC magnetic field that excites ferromagnetic resonance in the media, building up energy that eases the process of writing data.

HDDs often include a system-on-chip (SOC) to process data from a computer or other processing device into a suitable form to be written to the storage disk, and to transform signal waveforms read back from the storage disk into data for delivery to the computer. The SOC has extensive digital circuitry and has typically utilized advanced complementary metal-oxide-semiconductor (CMOS) technologies to meet cost and performance objectives. The HDD also generally includes a preamplifier that interfaces the SOC to the read/write head used to read data from and write data to the storage disk. As is well known, the read/write head may comprise, for example, separate read and write heads.

The preamplifier generally comprises one or more write drivers that provide corresponding write signals to the write head in order to write data to the storage disk. Such write signals are generally characterized as current signals, but may alternatively be characterized as voltage signals. Data bits are usually each stored as group of media grains oriented in a common magnetization direction (e.g., up or down). In order to record a given data bit, the write driver generates a write signal that transitions from a negative write current to a positive write current, or vice-versa, where the magnitude of the write current from zero to its peak value may be in the range of about 15 to 65 milliamperes (mA), although different values can be used.

At the completion of a given write operation, the write head may exhibit remanent magnetization after the write current has been turned off. This residual magnetization or "domain lock up" can be the cause of a phenomenon known as erase after write (EAW), where a non-energized (i.e., zero write current) head is seen to erase or degrade previously-written areas of the disk. These previously-written areas may comprise user data or even fixed servo sectors that are used to control the tracking of the radial position of the write head. In order to address the EAW problem, a degauss signal may be applied to the write head by the preamplifier immediately after completion of the write operation.

The typical degauss signal waveform includes current pulses of alternating polarities that repeat at a fixed frequency and decay in steady state amplitude over time. It is also known to vary the frequency of the degauss signal waveform. Waveforms of this type are referred to as "chirped" degauss signal waveforms. See U.S. application Ser. No. 13/186,445, filed Jul. 19, 2011 in the name of J. S. Goldberg et al. and entitled "Magnetic Storage Device with Chirped Write Head Degaussing Waveform," which is commonly assigned herewith and incorporated by reference herein.

SUMMARY

Illustrative embodiments of the invention provide HDDs or other types of disk-based storage devices that exhibit enhanced operating performance through the use of degauss circuitry including at least one ramp generator for use in generating a chirped degauss signal. For example, such a ramp generator may be configured to generate a current ramp for application to a current controlled oscillator.

In one embodiment, an HDD or other disk-based storage device comprises a storage disk, a write head configured to write data to the disk, and control circuitry coupled to the write head. The control circuitry comprises at least one write driver and degauss circuitry associated with the write driver. The degauss circuitry is configured to generate a chirped degauss signal to be applied to the write head by the write driver. The degauss circuitry comprises a ramp generator configured to generate a ramp signal for controlling a frequency of at least a portion of a waveform of the chirped degauss signal.

The ramp signal generated by the ramp generator may comprise a current ramp that is applied to a control input of a current controlled oscillator of the degauss circuitry. In such an arrangement, the ramp generator may illustratively comprise a first programmable digital to analog converter configured to generate a start frequency current of the current ramp responsive to a start frequency control signal, and a second programmable digital to analog converter configured to generate a stop frequency current of the current ramp responsive to a stop frequency control signal, with the first and second programmable digital to analog converters independently setting the respective start and stop frequency currents of the current ramp. The ramp generator may further comprise a reference circuit, an output circuit, slew rate control circuitry configured to control a rate of transition of the current ramp between the start frequency current and the stop frequency current, and switching circuitry configured to control biasing of the reference circuit responsive to a degauss mode signal. More particularly, the switching circuitry responsive to the degauss mode signal controls biasing of the reference circuit between the start frequency current and the stop frequency current in conjunction with initiation of a degauss mode of operation. Also, the switching circuitry further controls coupling of the output circuit to the slew rate control circuitry.

One or more of the embodiments of the invention provide significant improvements in disk-based storage devices. For example, by providing a degauss signal waveform in which the frequency of the degauss signal can be more easily and accurately controlled, improved write head demagnetization is achieved after each of a plurality of write operations in which data is written to the storage disk, thereby better avoiding problems such as EAW and leading to enhanced overall performance.

BRIEF DESCRIPTION OF THE DRAWINGS

FIG. 7 illustrates interconnection of the storage device of FIG. 1 with a host processing device in a data processing system.

FIG. 8 shows a virtual storage system incorporating a plurality of disk-based storage devices of the type shown in FIG. 1.

DETAILED DESCRIPTION

Embodiments of the invention will be illustrated herein in conjunction with exemplary disk-based storage devices, write drivers and associated degauss circuitry that includes a ramp generator for use in generating a chirped degauss signal waveform. It should be understood, however, that these and other embodiments of the invention are more generally applicable to any storage device in which improved head demagnetization and operating performance are desired. Additional embodiments may be implemented using components other than those specifically shown and described in conjunction with the illustrative embodiments.

Figure 1:
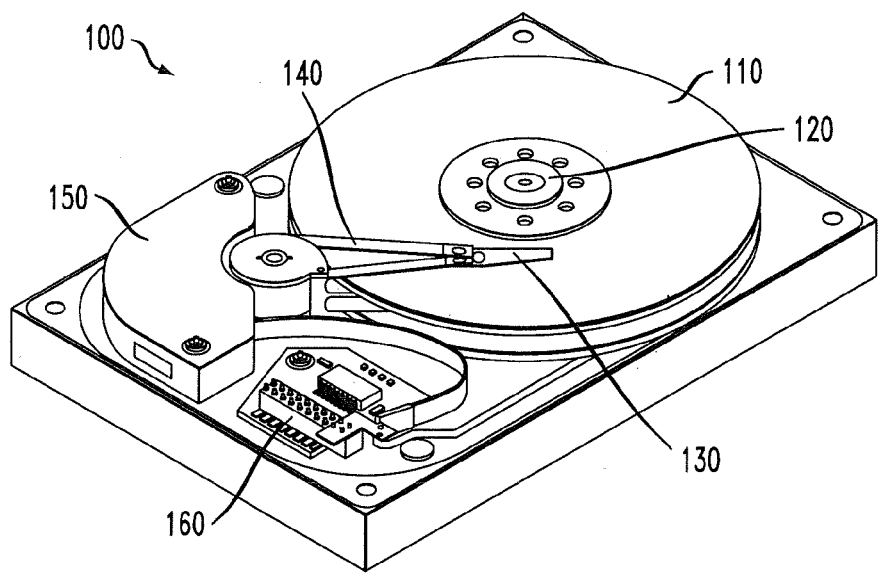
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials that are capable of storing data bits in the form of respective groups of media grains oriented in a common magnetization direction (e.g., up or down). The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. It is to be appreciated that the head 130 is shown only generally in FIG. 1. The position of the read/write head 130 over the magnetic surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1.

The term "control circuitry" as used herein is therefore intended to be broadly construed so as to encompass, by way of example and without limitation, drive electronics, signal processing electronics, and associated processing and memory circuitry, and may encompass additional or alternative elements utilized to control positioning of a read/write head relative to a storage surface of a storage disk in a storage device. A connector 160 is used to connect the storage device 100 to a host computer or other related processing device.

It is to be appreciated that, although FIG. 1 shows an embodiment of the invention with only one instance of each of the single storage disk 110, read/write head 130, and positioning arm 140, this is by way of illustrative example only, and alternative embodiments of the invention may comprise multiple instances of one or more of these or other drive components. For example, one such alternative embodiment may comprise multiple storage disks attached to the same spindle so all such disks rotate at the same speed, and multiple read/write heads and associated positioning arms coupled to one or more actuators.

A given read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. A given read/write head such as read/write head 130 may therefore include both a read head and a write head. Such heads may comprise, for example, write heads with wrap-around or side-shielded main poles, or any other types of heads suitable for recording and/or reading data on a storage disk. Read/write head 130 when performing write operations may be referred to herein as simply a write head.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should therefore be understood that the particular arrangement of elements shown in FIG. 1 is presented by way of illustrative example only. Those skilled in the art will recognize that a wide variety of other storage device configurations may be used in implementing embodiments of the invention.

Figure 2:
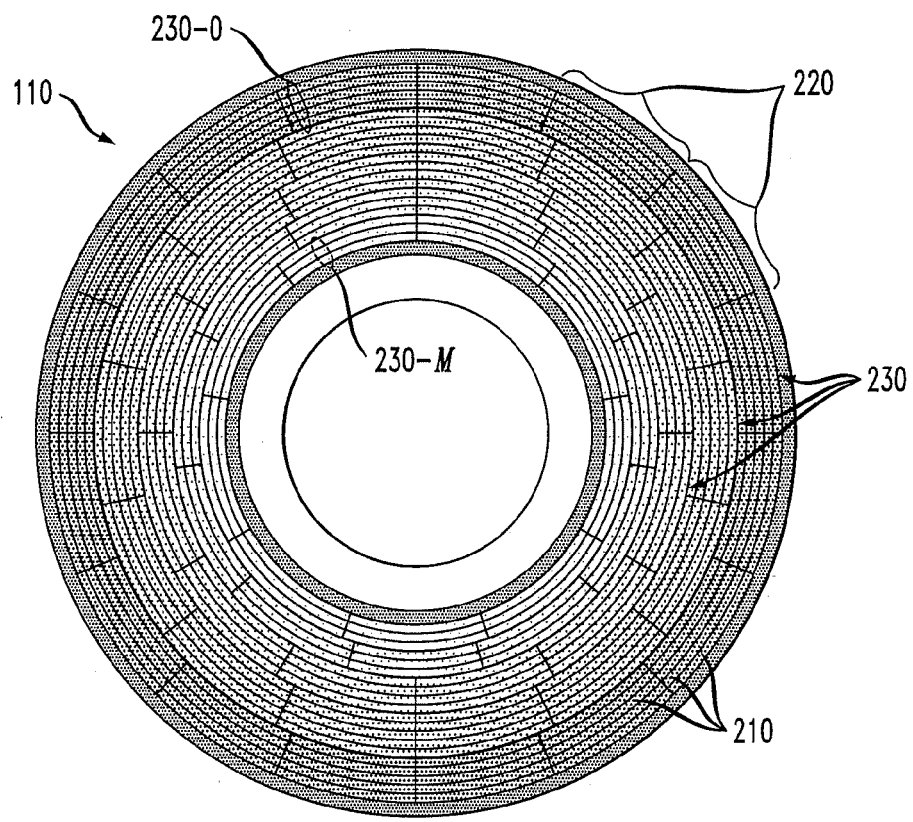
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two. As one example embodiment, provided by way of illustration only, the outermost annular zone may have a data transfer rate of approximately 2.3 Gigabits per second (Gb/s), while the innermost annular zone has a data transfer rate of approximately 1.0 Gb/s. In such an implementation, the HDD may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The storage disk 110 may be assumed to include a timing pattern formed on its storage surface. Such a timing pattern may comprise one or more sets of servo address marks (SAMs) or other types of servo marks formed in particular sectors in a conventional manner.

The particular data transfer rates and other features referred to in the embodiment described above are presented for purposes of illustration only, and should not be construed as limiting in any way. A wide variety of other data transfer rates and storage disk configurations may be used in other embodiments.

Embodiments of the invention will be described below in conjunction with FIGS. 3 to 8, in which the storage device 100 of FIG. 1 is configured to implement at least one write driver having associated degauss circuitry. The degauss circuitry is configured to generate a chirped degauss signal to be applied to the write head by the write driver, and comprises a ramp generator. The ramp generator is configured to generate a ramp signal for controlling a frequency of at least a portion of a waveform of the chirped degauss signal. The ramp signal generated by the ramp generator may comprise a current ramp that is applied to a control input of a current controlled oscillator of the degauss circuitry.

Figure 3:
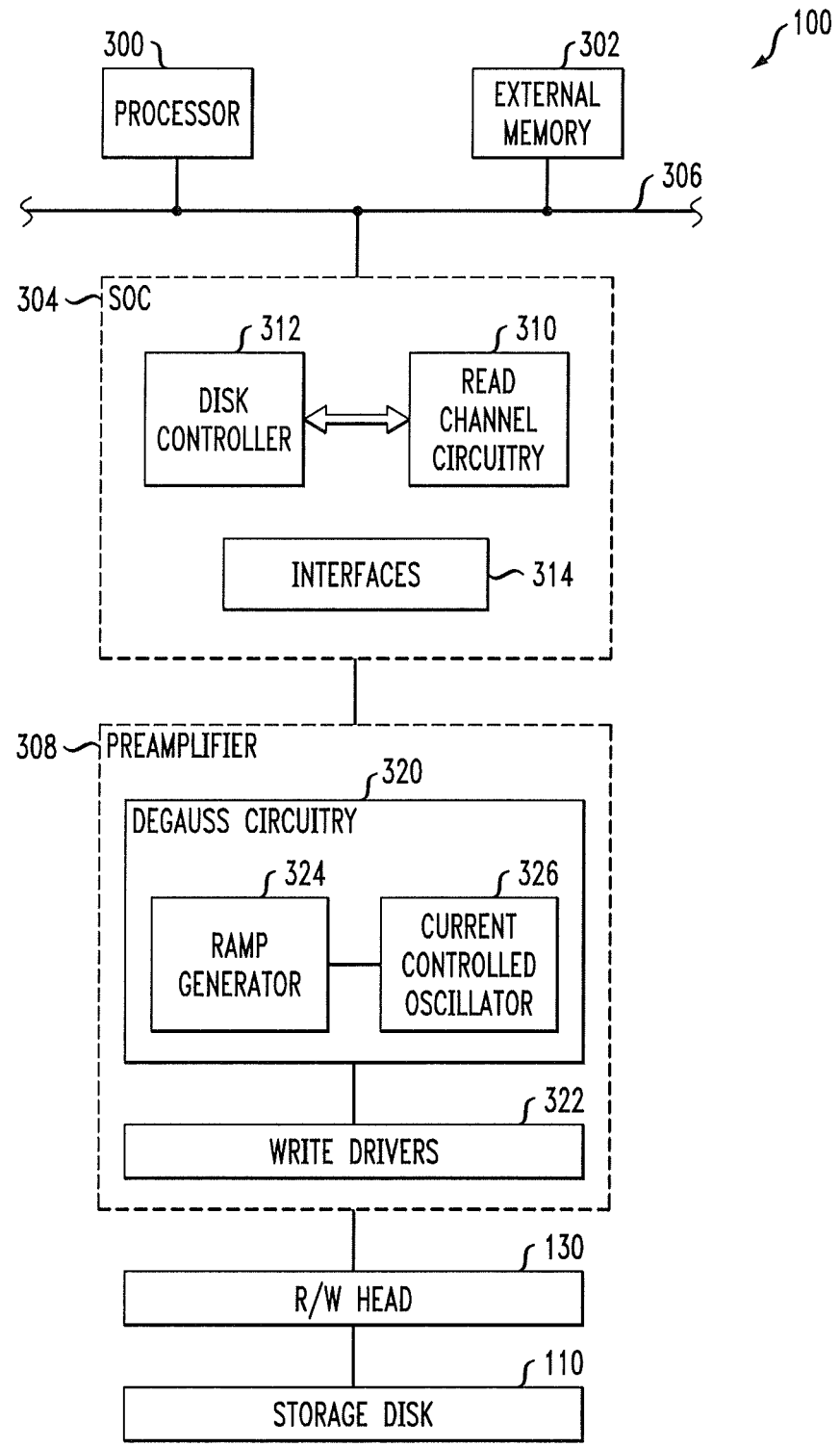
FIG. 3 is a block diagram of a portion of the storage device of FIG. 1 including a preamplifier comprising one or more write drivers and associated degauss circuitry.

FIG. 3 shows a portion of the storage device 100 of FIG. 1 in greater detail. In this view, the storage device 100 comprises a processor 300, a memory 302 and a system-on-a-chip (SOC) 304, which communicate over a bus 306. The storage device further comprises a preamplifier 308 providing an interface between the SOC 304 and the read/write head 130. The memory 302 is an external memory relative to the SOC 304 and other components of the storage device 100, but is nonetheless internal to that storage device. The SOC 304 in the present embodiment includes read channel circuitry 310 and a disk controller 312, and directs the operation of the read/write head 130 in reading data from and writing data to the storage disk 110. It communicates with the preamplifier 308 via interfaces 314.

The bus 306 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus may also be used to support communications between other system components, such as between the SOC 304 and the preamplifier 308. It should be understood that AXI interconnects are not required, and that a wide variety of other types of bus configurations may be used in embodiments of the invention.

The processor 300, memory 302, SOC 304 and preamplifier 308 may be viewed as collectively comprising one possible example of "control circuitry" as that term is utilized herein. Numerous alternative arrangements of control circuitry may be used in other embodiments, and such arrangements may include only a subset of the components 300, 302, 304 and 308, or portions of one or more of these components. For example, the SOC 304 itself may be viewed as an example of "control circuitry." The control circuitry of the storage device 100 in the embodiment as shown in FIG. 3 is generally configured to process data received from and supplied to the read/write head 130 and to control positioning of the read/write head 130 relative to the storage disk 110.

It should be noted that certain operations of the SOC 304 in the storage device 100 of FIG. 3 may be directed by processor 300, which executes code stored in external memory 302. For example, the processor 300 may be configured to execute code stored in the memory 302 for performing at least a portion of a degaussing process carried out by the SOC 304. Thus, at least a portion of the ramp control functionality of the storage device 100 may be implemented at least in part in the form of software code.

The external memory 302 may comprise electronic memory such as random access memory (RAM) or read-only memory (ROM), in any combination. In the present embodiment, it is assumed without limitation that the external memory 302 is implemented at least in part as a double data rate (DDR) synchronous dynamic RAM (SDRAM), although a wide variety of other types of memory may be used in other embodiments. The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, bus 306 and preamplifier 308. Alternatively, portions of the processor 300, memory 302, bus 306 and preamplifier 308 may be implemented at least in part in the form of one or more additional integrated circuits, such as otherwise conventional integrated circuits designed for use in an HDD and suitably modified to implement degauss circuitry having a ramp generator for use in generating a chirped degauss signal waveform as disclosed herein.

An example of an SOC integrated circuit that may be modified for use in embodiments of the invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an embodiment comprising an integrated circuit implementation, multiple integrated circuit dies may be formed in a repeated pattern on a surface of a wafer. Each such die may include degauss circuitry comprising at least one ramp generator as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

Although shown as part of the storage device 100 in the present embodiment, one or both of the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

Referring now more particularly to the preamplifier 308 of the storage device 100, the preamplifier in this embodiment comprises degauss circuitry 320 and associated write drivers 322. The degauss circuitry 320 comprises a ramp generator 324 that generates a current ramp for application to a current controlled oscillator 326. The degauss circuitry 320 is configured to control a chirped degauss signal waveform to be applied to the write head by one or more of the write drivers 322. The chirped degauss waveform exhibits a change in frequency over a plurality of pulses of that waveform. This frequency change may be an increase in frequency, also referred to as "chirp up" herein, or a decrease in frequency, also referred to as "chirp down" herein, or may include different segments of increasing frequency and decreasing frequency, as appropriate to the particular degaussing requirements of a given implementation of storage device 100. The term "chirped degauss signal" as used herein is therefore intended to encompass any degauss signal that exhibits an increase or decrease in frequency over at least a portion of its waveform. In some embodiments, an increasing frequency will be better able to remove remanent magnetization from the write head, while in other embodiments, a decreasing frequency may be more effective. The particular type of chirped degauss signal waveform to use in a given embodiment will depend upon application-specific factors such as the physical configuration of the write head, as well as the amplitude and frequency of the write signals used to record data on the storage medium.

A given write driver 322 in the present embodiment may comprise multiple distinct data paths, such as a high side data path and a low side data path, although different numbers of data paths may be used in other embodiments. It should be noted in this regard that the term "data path" as used herein is intended to be broadly construed, so as to encompass, for example, CMOS circuitry or other types of circuitry through which a data signal passes in preamplifier 308 or another storage device component.

Also, the term "write driver" is intended to encompass any type of driver circuitry that may be used to deliver or otherwise provide one or more degauss signals to the write head of the storage device 100. By way of example, a given one of the write drivers 322 may comprise an X side and a Y side, each comprising both high side and low side write drivers, where the X and Y sides are driven on opposite write cycles. Numerous alternative arrangements of circuitry are possible in other write driver embodiments.

The degauss circuitry 320 may include high side degauss circuitry which is coupled to high side write drivers for both X and Y sides, and low side degauss circuitry which is coupled to low side write drivers for both X and Y sides. The high and low side degauss control circuitry in such an embodiment may each include a separate ramp generator, or may share a single ramp generator.

Although illustratively shown in FIG. 3 as being separate from the write drivers 322, the degauss circuitry 320 may alternatively be implemented at least in part internally to the write drivers 322.

Different embodiments of the degauss circuitry 320 comprising ramp generator 324 and current controlled oscillator 326 will now be described with reference to FIGS. 4, 5 and 6.

Figure 4:
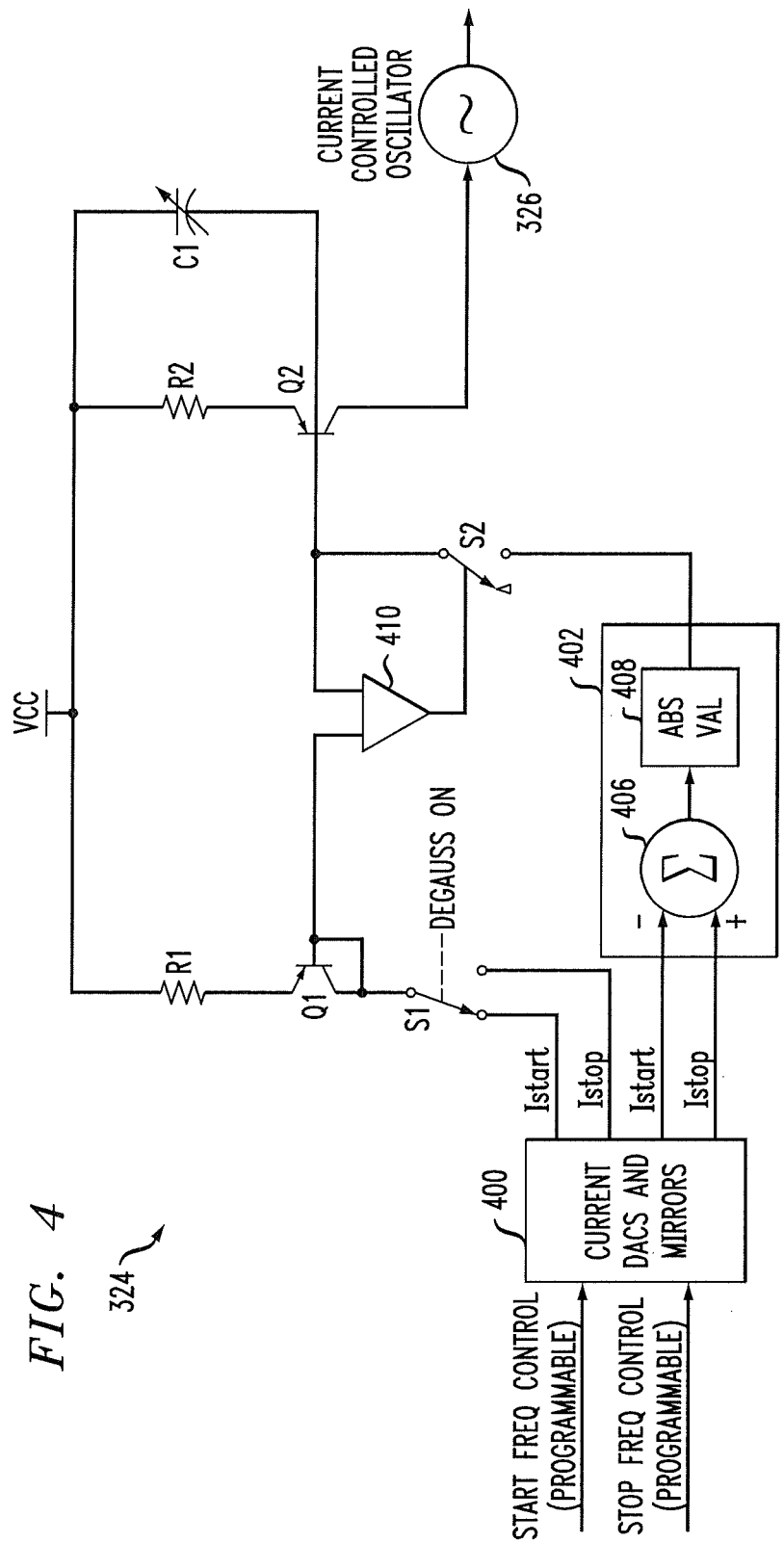
FIGS. 4, 5 and 6 show different embodiments of the degauss circuitry of FIG. 3.

In the FIG. 4 embodiment, the ramp generator 324 comprises a set of programmable digital to analog converters (DACs) 400, including a first programmable DAC configured to generate a start frequency current Istart of a current ramp responsive to a start frequency control signal, and a second programmable DAC configured to generate a stop frequency current Istop of the current ramp responsive to a stop frequency control signal. The DACs 400 are implemented as current DACs, and are assumed to be comprise one or more current mirrors such that the generated currents can be duplicated or scaled for use in other parts of the preamplifier 308. The first and second programmable DACs independently set the respective start and stop frequency currents Istart and Istop of the current ramp for at least a portion of a chirped degauss signal waveform. These start and stop frequency currents determine the start and stop frequencies of the current controlled oscillator 326.

The ramp generator 324 as shown in FIG. 4 further includes a reference circuit comprising a first p-n-p bipolar transistor Q1 and a resistor R1, an output circuit comprising a second p-n-p bipolar transistor Q2 and a resistor R2, slew rate control circuitry 402 configured to control a rate of transition of the current ramp between the start frequency current and the stop frequency current, and switching circuitry comprising a first switch S1 configured to control biasing of the reference circuit responsive to a degauss mode signal and a second switch S2 configured to control coupling of the output circuit to the slew rate control circuitry 402.

The switch S1 more particularly controls biasing of the reference circuit between the start frequency current and the stop frequency current in conjunction with initiation of a degauss mode of operation, and the switch S2 more particularly controls coupling of the output circuit to the slew rate control circuitry 402 in conjunction with initiation of the degauss mode of operation.

Thus, at the start of a degauss mode of operation, also referred to herein as a degauss cycle, a "degauss on" control signal applied to a control input of switch S1 is at a first logic level which causes S1 to connect the collector of Q1 to the stop frequency current rather than the start frequency current. The resulting current step causes a voltage differential between the bases of Q1 and Q2 that will cause switch S2 to close. At the end of the degauss cycle, the "degauss on" control signal returns to a second logic level which causes S1 to once again connect the collector of Q1 to the start frequency current.

In the reference circuit, which as noted above comprises Q1 and R1, the emitter of Q1 is coupled via R1 to an upper supply voltage, illustratively VCC, and the collector of Q1 is controllably connectable via switch S1 to the start frequency current output of DACs 400 or the stop frequency current output of DACs 400. Also, Q1 is configured in a diode-connected arrangement, with its base and collector coupled together. As indicated above, the reference circuit biasing is switched from the start frequency current to the stop frequency current at the start of a degauss cycle by switch S1. This produces a step response in the reference circuit. The voltage across resistor R1 is directly related to the current. The resistor R1 is configured in series with the diode-connected bipolar transistor Q1, which is fairly independent of current changes over a narrow range, such that the reference voltage provided by the reference circuit is dominated by the voltage across resistor R1.

In the output circuit, which as noted above comprises Q2 and R2, the emitter of Q2 is coupled via R2 to the upper supply voltage VCC, the collector of Q2 provides the output current ramp to a control input of the current controlled oscillator 326, and the base of Q2 is controllably connectable via switch S2 to an output of the slew control circuitry 402.

The ramp generator 324 also includes a variable capacitor C1 coupled between the base of the Q2 and VCC. The variable capacitor C1 may be considered part of the output circuit, in combination with Q2 and R2, and is typically implemented as a well-controlled element with little process variation. The output circuit generates current to match that generated by the reference circuit. The output current will slew to its final value by integration across the variable capacitor C1. The rate of integration is a function of the absolute value of the difference between the start frequency current and stop frequency current as determined by the slew rate control circuitry 402. The transistor Q2 and resistor R2 are similar to respective devices Q1 and R1, which helps to cancel process variation due to manufacturing. Since an active bipolar transistor is used for Q2, most of the current from slew rate control circuitry 402 flows directly into variable capacitor C1. As noted above, the collector current of Q2 is the current ramp applied to the control input of the current controlled oscillator 326.

The slew rate control circuitry 402 in the FIG. 4 embodiment comprises a difference circuit 406 coupled to an absolute value element 408. The difference circuit 406 has a first input coupled to an output of the first programmable DAC of the set of DACs 400 and a second input coupled to an output of the second programmable DAC of the set of DACs 400. The difference circuit 406 is configured to determine a difference between the start frequency current and the stop frequency current as supplied from the respective first and second DACs. The absolute value element 408 is configured to generate an absolute value of the difference for application to the output circuit via switch S2.

The switch S2 that couples the base of Q2 to the output of the slew rate control circuitry 402 is controlled by an output of a comparator 410. The comparator 410 has a first input coupled to the base of Q1, a second input coupled to the base of Q2, and an output coupled to a control input of S2. This arrangement is configured to initiate the slewing of the current ramp at the start of a degauss cycle and to terminate the slewing of the current ramp when the current ramp reaches the stop frequency current.

In the ramp generator 324 of FIG. 4, the current comparison is made indirectly utilizing the base voltages of Q1 and Q2. As the change in base-to-emitter voltage (Vbe) of each of Q1 and Q2 is relatively insignificant, the base voltages will approximate the voltages across respective resistors R1 and R2. The comparator 410 and switch S2 control the integration of current across the variable capacitor C1 such that C1 will stop charging when the two base voltages are equal.

Thus, in the FIG. 4 embodiment, the slew rate of the current ramp is controlled by the value of variable capacitor C1, which integrates the current until the output circuit voltage at the base of Q2 matches the reference circuit voltage at the base of Q1, as well as the absolute value of the difference between the start frequency current and stop frequency current as supplied by slew rate control circuitry 402 via switch S2. As capacitor C1 can have a well-controlled value over process variation, the slew rate can be made nearly ideal.

At the end of a given degauss cycle, switch S1 will switch the collector of Q1 from the stop frequency current back to the start frequency current. This will produce a difference in the base voltages of Q1 and Q2 so that switch S2 will close until the base voltage of Q2 slews to substantially the same value as the base voltage of Q1. The slew rate is again a function of the value of capacitor C1 and the current from slew rate control circuitry 402.

Figure 5:
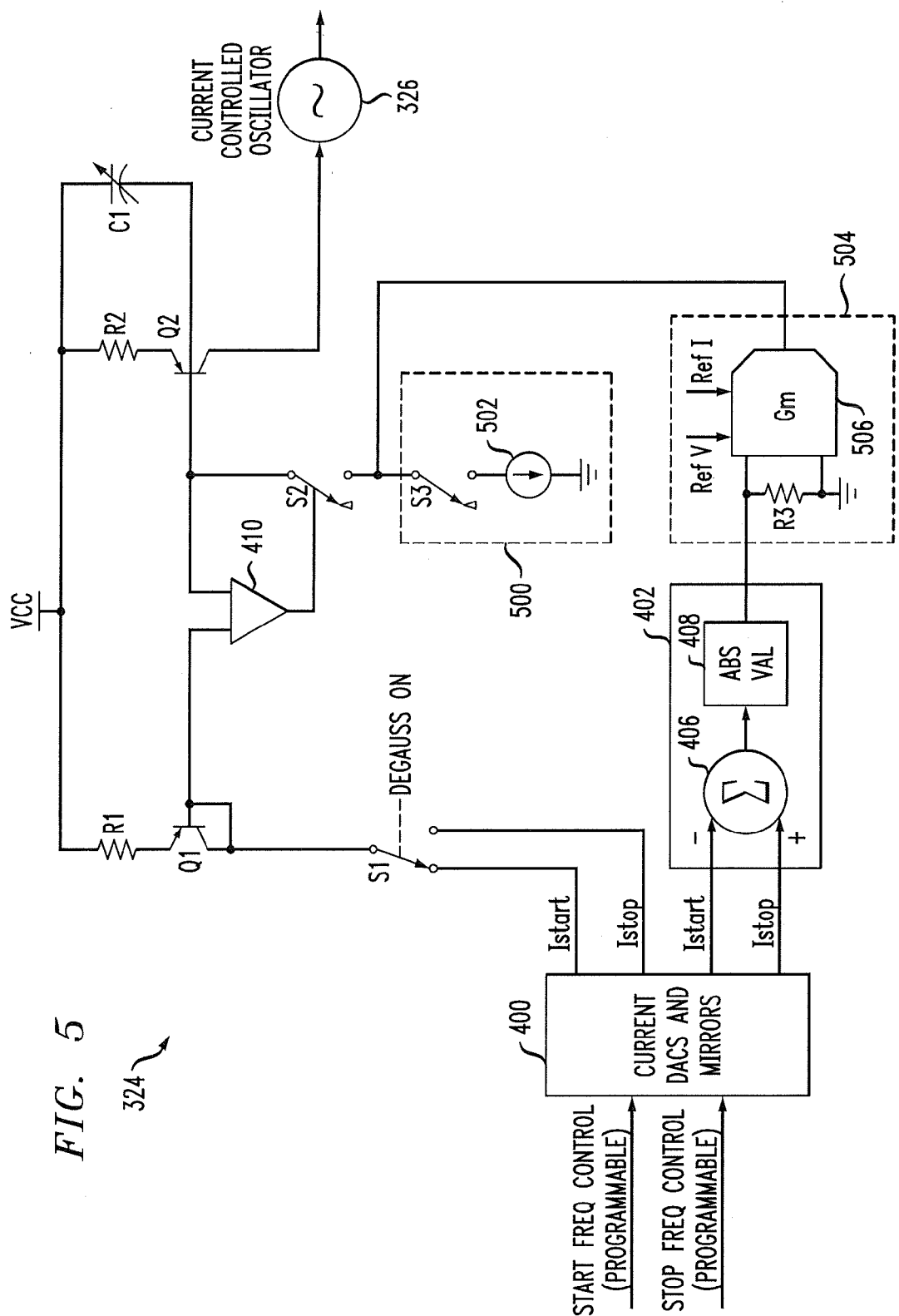

Turning now to FIG. 5, another embodiment of the ramp generator 324 is shown. This embodiments includes the same set of programmable DACs 400, reference circuit comprising Q1 and R1, output circuit comprising Q2 and R2, switching circuitry S1 and S2, variable capacitor C1, slew rate control circuitry 402, and comparator 410 as in the FIG. 4 embodiment. However, the FIG. 5 embodiment further comprises a first additional circuit 500 which includes a switch S3 and a current source 502, and a second additional circuit 504 which includes a transconductance cell 506.

In the first additional circuit 500, the switch S3 controllably connects a pole of switch S2 to the current source 502. The current source 502 is switched in at the end of a given degauss cycle in order to speed up recovery of the ramp generator 324 to its initial conditions in preparation for the next degauss cycle.

The transconductance cell 506 is configured to receive an absolute current from the absolute value element 408 of slew rate control circuitry 402 and to convert the absolute current to a current that is a function of a resistor type used in both the reference circuit and the output circuit. This helps to produce a current with a slew rate that is relatively independent of the manufacturing process. The transconductance cell 506 receives as inputs a reference voltage and a reference current, and the current output of the absolute value element 408 is converted to a voltage across two other input terminals by passing the current through resistor R3 to a lower supply voltage, illustratively ground potential. The output of the transconductance cell 506 is coupled to the pole of switch S2 that is controllably connectable to the current source 502 via switch S3.

In the FIG. 4 embodiment, the output current from the collector of Q2 and the slew rate are both strong functions of the process variations associated with resistor R2. The FIG. 5 embodiment is configured to compensate for the effect of R2 process variation on output current and slew rate, by configuring resistor R3 using substantially the same process used for R2, such that R3 process variation will track R2 process variation. Thus, process variation in the voltage across resistor R3 will track process variation in the voltage across R2. The transconductance cell 506 converts the voltage across R3 to a current and the resulting current adjusts the integration rate across C1 and compensates for process variation in R2, thereby making the output current ramp independent of process variation.

In the transconductance cell 506, the transconductance may be controlled using a master-slave pair, with the master being biased with a precise voltage that is fairly independent of process and temperature and loaded with a current that is also fairly independent of process and temperature. This voltage and current use a feedback circuit to set the bias current levels of both the master and the slave.

Figure 6:
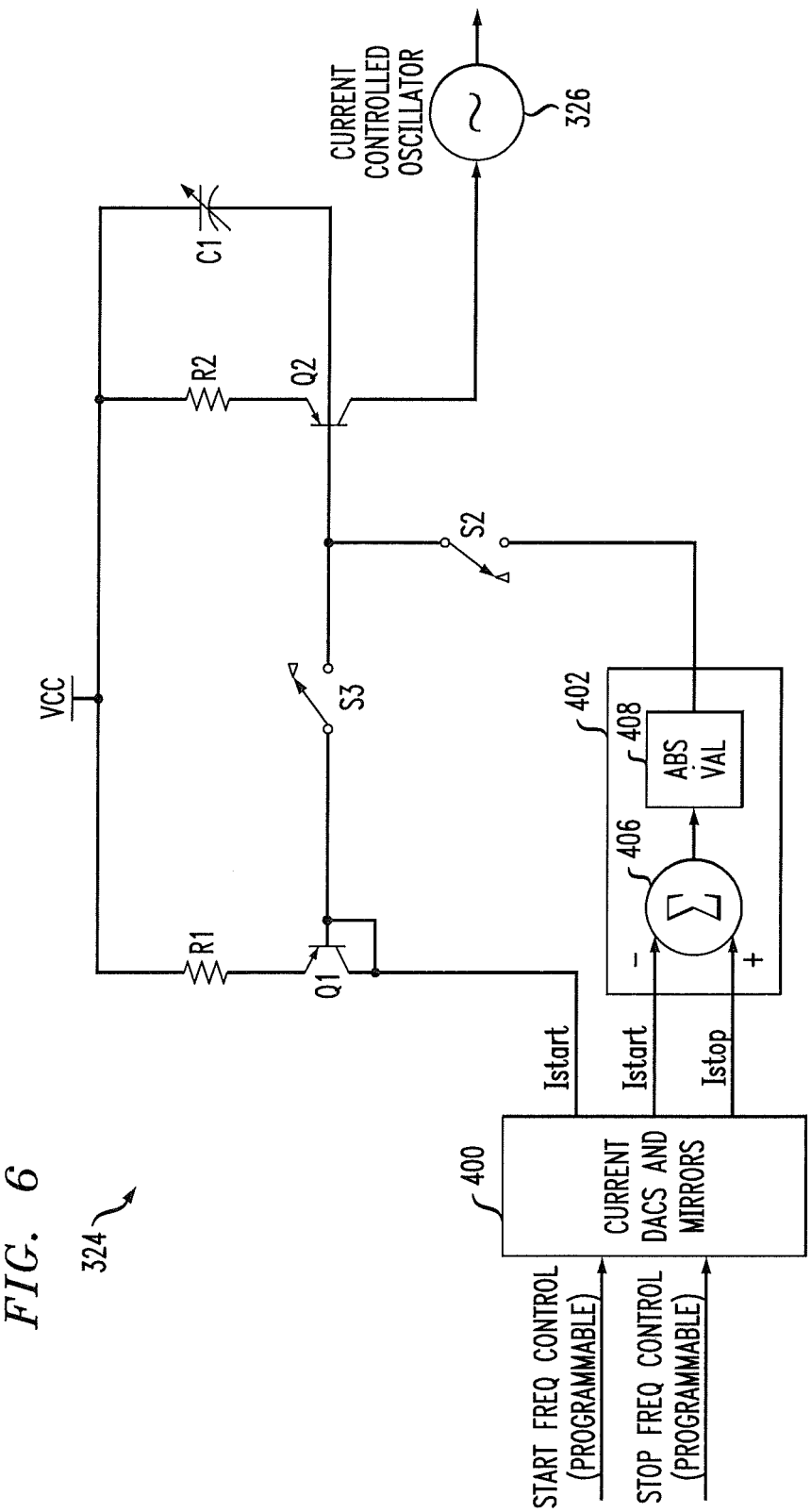

The FIG. 6 embodiment is also similar to the FIG. 4 embodiment, but instead of incorporating additional circuitry as in FIG. 5, represents a simplified version in which comparator 410 and switch S1 are eliminated. Instead, the base of Q1 is controllably connectable to the base of Q2 via a switch S3. Prior to a degauss cycle, switch S3 is used to bias Q2, R2 and C1 in a state where the collector current of Q2 is a mirrored version of the collector current of Q1. When the degauss cycle begins, switch S3 is opened and switch S2 is closed, so that the voltage at the base of Q2 begins to slew in an open-loop configuration from the start current towards the stop current.

In the FIG. 6 embodiment, as indicated previously, switch S1 is eliminated and the start frequency current Istart flows through Q1 at all times. Another possible implementation of the FIG. 6 embodiment may include the switch S1 configured as shown in the FIG. 4 and FIG. 5 embodiments.

Exemplary component values that may be used in a given implementation of one or more of the above-described embodiments include 4.3 k$\Omega$, 4.3 k$\Omega$ and 2.5 k$\Omega$ for resistors R1, R2 and R3, respectively, and a range of about 0.25 pF to 4.0 pF for variable capacitor C1 as degauss ramp duration changes from about 5 ns to 80 ns. Other component values can be used in other implementations.

The illustrative embodiments provide a number of significant advantages relative to conventional degaussing arrangements. For example, by providing improved control of chirped degauss signal frequency, a more efficient reduction of magnetization can be achieved in the write head after write operations, thereby substantially eliminating EAW and enhancing the overall performance of the storage device 100. Also, the illustrative embodiments can produce a wide variety of different types of chirped degauss signals for a variety of different applications in a cost-effective manner.

It is to be appreciated that the particular degauss circuitry arrangements shown in FIGS. 4-6 are presented by way of example only, and other embodiments of the invention may utilize other types and arrangements of elements for generating a degauss signal waveform as disclosed herein.

For example, in one or more embodiments of the invention, various amplitude adjustments may be made to the degauss signal waveform, in addition to frequency adjustments of the type disclosed herein. This may involve configuring the degauss circuitry to include separate control mechanisms for controlling respective steady state and overshoot portions of the waveform, as described in U.S. patent application Ser. No. 13/447,741, filed Apr. 16, 2012 and entitled "Storage Device Having Degauss Circuitry with Separate Control of Degauss Signal Steady State and Overshoot Portions," which is commonly assigned herewith and incorporated by reference herein.

Also, the particular frequency variations described in conjunction with the embodiments of FIGS. 4 to 6 may be altered in other embodiments. Accordingly, a wide variety of different types of ramps may be used, including ramps of increasing or decreasing frequency, or ramps with different segments that increase or decrease at different rates.

In addition, numerous other types of control mechanisms may be used to establish different increase or decrease rates or other characteristics for one or more ramps or ramp segments for generating a given degauss signal waveform.

As mentioned previously, the storage device configuration can be varied in other embodiments of the invention. For example, the storage device may comprise a hybrid HDD which includes a flash memory in addition to one or more storage disks.

It should also be understood that the particular storage disk configuration and recording mechanism can be varied in other embodiments of the invention. For example, a variety of recording techniques including SMR, BPM, HAMR and MAMR can be used in one or more embodiments of the invention.

FIG. 7 illustrates a processing system 700 comprising the disk-based storage device 100 coupled to a host processing device 702, which may be a computer, server, communication device, etc. Although shown as a separate element in this figure, the storage device 100 may be incorporated into the host processing device. Instructions such as read commands and write commands directed to the storage device 100 may originate from the processing device 702, which may comprise processor and memory elements similar to those previously described in conjunction with FIG. 3.

Multiple disk-based storage devices 100 may be incorporated into a virtual storage system 800 as illustrated in FIG. 8. The virtual storage system 800, also referred to as a storage virtualization system, illustratively comprises a virtual storage controller 802 coupled to a RAID system 804, where RAID denotes Redundant Array of Independent Disks. The RAID system more specifically comprises N distinct storage devices denoted 100-1, 100-2, . . . 100-N, one or more of which are assumed to be configured to include degauss circuitry with a ramp generator as disclosed herein. These and other virtual storage systems comprising HDDs or other disk-based storage devices of the type disclosed herein are considered embodiments of the invention. The host processing device 702 in FIG. 7 may also be an element of a virtual storage system, and may incorporate the virtual storage controller 802.

Again, it should be emphasized that the above-described embodiments of the invention are intended to be illustrative only. For example, other embodiments can use different types and arrangements of storage disks, write heads, control circuitry, preamplifiers, write drivers, degauss circuitry, ramp generators, controllable oscillators and other storage device elements for implementing the described chirped degauss signal generation functionality. Also, the particular manner in which a ramp generator is configured to generate a ramp signal for controlling the frequency of a given chirped degauss signal waveform may be varied in other embodiments. These and numerous other alternative embodiments within the scope of the following claims will be apparent to those skilled in the art.

What is claimed is:

1. An apparatus comprising:
control circuitry adapted for coupling to a write head configured to write data to a storage disk, the control circuitry being configured to process data supplied to the write head;
wherein the control circuitry comprises:
a write driver; and
degauss circuitry associated with the write driver and configured to generate a chirped degauss signal to be applied to the write head by the write driver;
wherein the degauss circuitry comprises a ramp generator configured to generate a ramp signal for controlling a frequency of at least a portion of a waveform of the chirped degauss signal; and
wherein the ramp generator is configured to set a start frequency and a stop frequency for said waveform responsive to respective start and stop frequency control signals.

2. The apparatus of claim 1 wherein the ramp signal generated by the ramp generator comprises a current ramp.

3. The apparatus of claim 2 wherein the degauss circuitry further comprises a current controlled oscillator having a control input coupled to a current ramp output of the ramp generator.

4. The apparatus of claim 1 wherein the waveform of the chirped degauss signal comprises one of the following:
at least one segment of increasing frequency;
at least one segment of decreasing frequency; and
a plurality of different segments including at least one segment of increasing frequency and at least one segment of decreasing frequency.

5. The apparatus of claim 2 wherein the ramp generator comprises:
a first programmable digital to analog converter configured to generate a start frequency current of the current ramp responsive to the start frequency control signal; and
a second programmable digital to analog converter configured to generate a stop frequency current of the current ramp responsive to the stop frequency control signal;
wherein the first and second programmable digital to analog converters independently set the respective start and stop frequency currents of the current ramp.

6. The apparatus of claim 5 wherein the ramp generator further comprises:
a reference circuit;
an output circuit; and
slew rate control circuitry configured to control a rate of transition of the current ramp between the start frequency current and the stop frequency current.

7. The apparatus of claim 6 wherein the ramp generator further comprises:
switching circuitry configured to control biasing of the reference circuit responsive to a degauss mode signal;
wherein the switching circuitry responsive to the degauss mode signal controls biasing of the reference circuit in conjunction with initiation of a degauss mode of operation; and
wherein the switching circuitry further controls coupling of the output circuit to the slew rate control circuitry.

8. The apparatus of claim 7 wherein the reference circuit comprises a first p-n-p bipolar transistor having an emitter coupled via a first resistor to an upper supply voltage, and a collector controllably connectable to the start frequency current or the stop frequency current via a first switch of the switching circuitry.

9. The apparatus of claim 8 wherein the output circuit comprises a second p-n-p bipolar transistor having an emitter coupled via a second resistor to the upper supply voltage, a collector providing said current ramp, and a base controllably connectable to an output of the slew control circuitry via a second switch of the switching circuitry.

10. The apparatus of claim 9 wherein the ramp generator further comprises a variable capacitor coupled between the base of the second p-n-p bipolar transistor and the upper supply voltage.

11. The apparatus of claim 9 wherein the ramp generator further comprises a comparator circuit having a first input coupled to the base of the first p-n-p bipolar transistor, a second input coupled to the base of the second p-n-p bipolar transistor, and an output coupled to a control input of the second switch, such that slewing is terminated when the current ramp matches the stop frequency current.

12. The apparatus of claim 9 wherein the first p-n-p bipolar transistor has a base that is controllably connectable to the base of the second p-n-p bipolar transistor via a third switch of the switching circuitry.

13. The apparatus of claim 7 wherein the slew rate control circuitry comprises:
a difference circuit having a first input coupled to an output of the first programmable digital-to-analog converter and a second input coupled to an output of the second programmable digital-to-analog converter, the difference circuit being configured to determine a difference between the start frequency current and the stop frequency current; and
an absolute value element configured to generate an absolute value of the difference for application to the output circuit.

14. The apparatus of claim 13 wherein the slew rate control circuitry further comprises a transconductance cell configured to receive an absolute current from the absolute value element and to convert the absolute current to a current that is a function of a resistor type used in both the reference circuit and the output circuit.

15. The apparatus of claim 1 wherein the control circuitry is fabricated in at least one integrated circuit.

16. A storage device comprising the apparatus of claim 1.

17. The storage device of claim 16 wherein the storage device comprises a hard disk drive.

18. A virtual storage system comprising the storage device of claim 16.

19. The virtual storage system of claim 18 wherein the virtual storage system comprises a redundant array of independent disks.

20. A method comprising the steps of:
writing data to a storage disk via a write head of a storage device;
generating a ramp signal;
generating a chirped degauss signal having a waveform at least a portion of which has a frequency that is controlled in accordance with the ramp signal; and
applying the chirped degauss signal to the write head of the storage device; and
wherein the step of generating the ramp signal comprises setting a start frequency and a stop frequency for said waveform responsive to respective start and stop frequency control signals.

21. The method of claim 20 wherein the step of generating the ramp signal further comprises generating a current ramp for application to a control input of a current controlled oscillator used to generate the chirped degauss signal.

22. A non-transitory computer-readable storage medium having embodied therein executable code for performing the steps of the method of claim 20.

23. An apparatus comprising:
control circuitry adapted for coupling to a write head configured to write data to a storage disk, the control circuitry being configured to process data supplied to the write head;
wherein the control circuitry comprises:
a write driver; and
degauss circuitry associated with the write driver and configured to generate a chirped degauss signal to be applied to the write head by the write driver;
wherein the degauss circuitry comprises:
a ramp generator configured to generate a ramp signal for controlling a frequency of at least a portion of a waveform of the chirped degauss signal, wherein the ramp signal generated by the ramp generator comprises a current ramp; and
a current controlled oscillator having a control input coupled to a current ramp output of the ramp generator.

24. A method comprising the steps of:
writing data to a storage disk via a write head of a storage device;
generating a ramp signal;
generating a chirped degauss signal having a waveform at least a portion of which has a frequency that is controlled in accordance with the ramp signal; and
applying the chirped degauss signal to the write head of the storage device;
wherein the step of generating the ramp signal comprises generating a current ramp for application to a control input of a current controlled oscillator used to generate the chirped degauss signal.

* * * * *